United States Patent
Schweitzer, III et al.

(10) Patent No.: US 7,345,862 B2
(45) Date of Patent: Mar. 18, 2008

(54) PROTECTIVE RELAY FOR POWER SYSTEMS HAVING FAULT DISTANCE MEASUREMENT FILTER LOGIC

(75) Inventors: Edmund O. Schweitzer, III, Pullman, WA (US); Joseph B. Mooney, Colfax, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 229 days.

(21) Appl. No.: 10/695,978

(22) Filed: Oct. 29, 2003

(65) Prior Publication Data

US 2005/0094335 A1    May 5, 2005

(51) Int. Cl.
    *H02H 3/42* (2006.01)
(52) U.S. Cl. ...................................... 361/80
(58) Field of Classification Search ............... 361/80, 361/89, 84
    See application file for complete search history.

(56) References Cited

U.S. PATENT DOCUMENTS 5,784,241 A * 7/1998 Munch et al. ............. 361/111
6,028,754 A * 2/2000 Guzman-Casillas et al. .. 361/89

* cited by examiner

Primary Examiner—Robert L. Deberadinis
Assistant Examiner—Lucy Thomas
(74) Attorney, Agent, or Firm—Cook, Alex, McFarron, Manzo, Cummings & Mehler, Ltd.

(57) ABSTRACT

The system is used in a distance-type protective relay which includes a calculation circuit responsive to voltage and current values from a power line to produce a quantity which is analogous to the distance between the relay and a fault on the line, referred to as an m quantity. This quantity is then applied to a distance element/circuit for comparison of said quantity with a setting reach value for a zone one distance protection to determine whether the fault is within zone one protection. The system includes a filter circuit which filters the quantity before it reaches the distance element, resulting in a smoothing of said quantity and rejection of noise therefrom. The system further includes a control circuit which determines whether the filter is to be used in the system in a particular situation, depending upon whether when the value of the quantity is above a selected percentage of the setting reach value.

10 Claims, 3 Drawing Sheets

PROTECTIVE RELAY FOR POWER SYSTEMS HAVING FAULT DISTANCE MEASUREMENT FILTER LOGIC

TECHNICAL FIELD

This invention relates generally to power system protective relays and more particularly concerns a distance-type protective relay which determines whether or not an existing fault is within a particular zone of protection for the relay, for example, within a zone one distance from the relay.

BACKGROUND OF THE INVENTION

Distance relays determine, typically by impedance analysis and comparison, whether a particular fault on the power line is within a particular zone (reach) of protection for the relay, for instance a zone one reach. The distance relay calculates an impedance value and then compares that value against a preselected setting value, also referred to as a set reach value, for the zone one distance. If the calculated value is less than the set reach value for zone one, the fault is recognized to be within zone one. A signal is then produced which trips the circuit breaker for that portion of the power line. If the calculated value is greater than the set reach value, indicating that the fault is outside of zone one, there is no trip signal produced. Distance type protective relays are designed and arranged to cover several "zones" along a given portion of a power line. The distance for a particular zone is referred to as the "reach" of the zone.

A protective relay will thus usually have several protection zones and will have setting values associated with each zone. Each zone is associated with a particular distance along the power line associated with the relay. To ensure that the fault is within in a selected zone of protection e.g. zone one, a quantity analogous to the actual distance to the fault is determined, using, for instance, values of replica impedance, polarizing voltage, as well as voltage and current samples from the power line. This analogous quantity, referred to herein as an m quantity or m value, provides a reliable indication of both the direction of the fault, i.e. whether it is in front or in back of the relay, and an indication of an underimpedance condition in the selected zone, when the m quantity is compared against a preselected setting value. This is explained in more detail in U.S. Pat. No. 5,325,061, owned by the assignee of the present invention, the contents of which are incorporated by reference herein.

Faults on the power line which produce an m value less than the set reach value associated with zone one result in a trip signal for the associated circuit breaker. However, faults on the power line which produce an m value greater than the set reach value are beyond the reach of the selected zone of protection, indicating that the relay should not trip the circuit breaker associated with that zone of protection.

Typically, this arrangement produces fast and accurate results relative to faults within the selected zone of protection. However, when a particular fault results in an m value that is just slightly greater than the set reach value, an inaccurate trip decision may be made. Measurement noise and variations in the voltage and current values from the power line can result in the m value varying over time. In some cases, the m value will vary such that at certain points in time, it will go below the set reach value, and a trip signal is generated, even though the fault may be outside the zone of protection. Hence, there is an accuracy concern with respect to existing systems where the m value is very close to the set reach value for a selected zone of protection, meaning that the fault is close to the boundary of the protection zone. It would be desirable that a protection system have the capability of making consistent, accurate fault determinations relative to a selected zone of protection regardless of how close the fault is to the end of the zone.

SUMMARY OF THE INVENTION

Accordingly, the present invention is a system for improving the performance of a distance-type protective relay for power systems, wherein the relay includes a calculation circuit responsive to voltage and current values from the power line to produce a quantity (m quantity herein) which is analogous to the distance between the relay and a fault on the power line, wherein the quantity is applied to a distance element for comparison of said quantity with a setting reach value for a selected zone of protection, wherein the system comprises: a filter circuit responsive to said quantity for filtering said quantity before the quantity is applied to the distance element, resulting in the smoothing of the quantity; and a control circuit for controlling the application of the filtered quantity to the distance element such that the filtered quantity is applied only when said quantity is above a preselected first threshold value.

In accordance with another aspect of the invention, provided is an apparatus for selecting between one of a first distance value (analog m value) and a second distance value provided to a distance element of a protective relay providing protection for a transmission line of a power system. The distance relay includes a calculation circuit adapted to provide the first distance value indicative of a distance between the protective relay and a fault, and a filter adapted to filter the first distance value to form the second distance value (filtered analog m value). The apparatus includes a first comparator having a first input adapted to receive the first distance value, a second input adapted to receive a first percentage of a zone reach value and an output. The first percentage of the zone reach value is greater than the zone reach value. The apparatus also includes a second comparator having a first input adapted to receive the first distance value, a second input adapted to receive a second percentage of the zone reach value and an output. The second percentage of the zone reach value is less than the zone reach value. The apparatus further includes an AND-gate having a first input coupled to the output of the first comparator, a second inverting input coupled to the output of the second comparator and an output, and an OR-gate having a first inverting input coupled to the output of the AND-gate, a second input coupled to the output of the second comparator and an output.

In accordance with a further aspect of the invention, provided is a method for selecting between one of a first distance value (analog m value) and a second distance value provided to a distance element of a protective relay providing protection for a transmission line of a power system. The distance relay includes a calculation circuit adapted to provide the first distance value indicative of a distance between the protective relay and a fault, and a filter adapted to filter the first distance value to form the second distance value (filtered analog m value). The method includes comparing the first distance value to a first percentage of a zone reach value to form a first binary output. The first percentage of the zone reach value is greater than the zone reach value. The method also includes comparing the first distance value to a second percentage of the zone reach value to form a second binary output. The second percentage of the zone reach value is less than the zone reach value. The method further includes providing the first distance value to the distance element when the first binary output comprises a low binary value or when the second binary output comprises a high binary value, and providing the second distance value to the distance element when the first binary output comprises a high binary value and the second binary output comprises a low binary value.

BEST MODE FOR CARRYING OUT THE INVENTION

The present invention is directed toward a distance protective relay for power lines, which determines a quantity, referred to herein as an m value, which is analogous/related to the distance from the relay to a fault on the power line and then compares that m value to a zone one setting value, also referred to herein as a set reach value, to determine whether or not the fault is within the particular zone protection, e.g. zone one protection, associated with setting value. If the fault is within the zone one protection, then the relay will trip the circuit breaker associated with the power line, while if the fault is determined to be outside of the zone one distance, then the relay will not operate, i.e. it will not trip the circuit breaker.

Occasionally, as discussed above, the m value will be quite close to the setting value associated with zone one protection, i.e. the fault is quite close to the end (the far reach) of the zone. With measurement noise and some variations in the voltage and current, the m value will vary in time and inaccurate results may result, i.e. the m value may indicate that the distance to the fault is within the zone one protection (or vise versa), when in reality the opposite is true. An inaccurate distance decision is of course undesirable.

Figure 1:
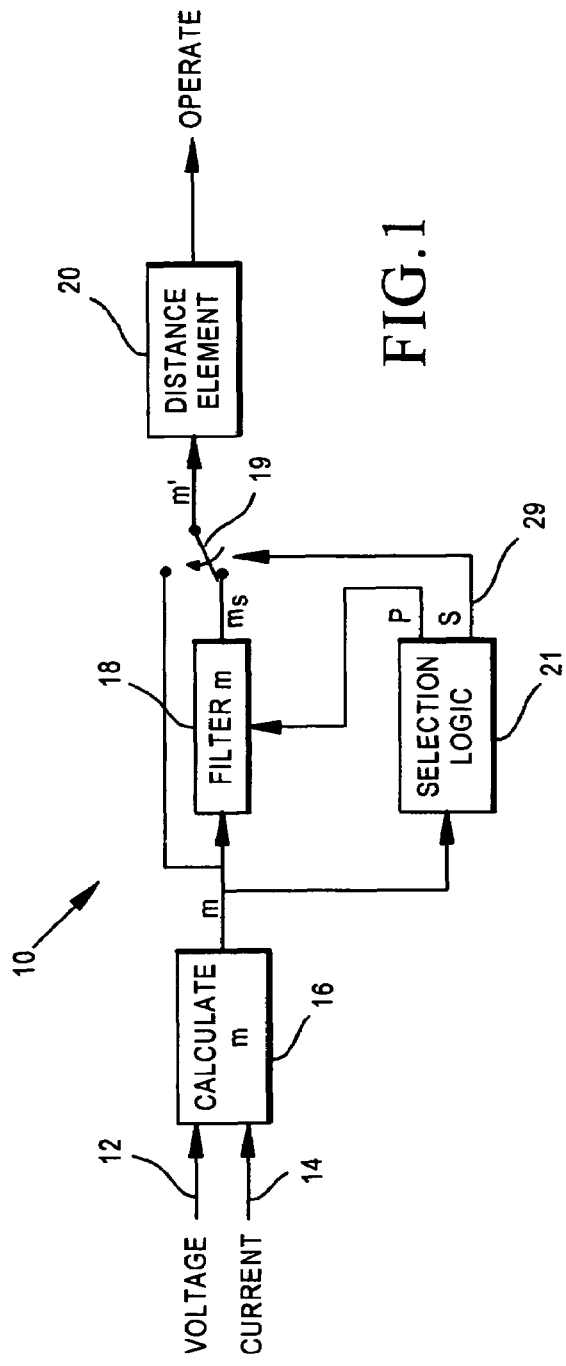
FIG. 1 is a block diagram of the system of the present invention.

FIG. 1 shows the block diagram of the present invention. In conventional form, voltage values and current values from the power line are used to calculate the m quantity. Again, the m quantity (value) can be calculated in various ways, including as discussed in the '061 patent.

The m value is used to determine whether or not the fault distance from the relay is within the desired zone of protection of the relay, e.g. zone one.

In FIG. 1, voltage values 12 are used with current values 14 from the power line in system 10 by calculation circuit 16 to determine the m value. The m value from circuit 16 is then applied to a filter 18. Filter 18 is used to smooth out the m values from circuit 16 by attenuating the noise which is present on the signal, as well as smoothing variations in the voltage and current inputs. The resulting filtered m value is referred to as $m_s$ for m smoothed. The original m value from circuit 16 is not smoothed. The resulting $m_s$ value, as well as the m value from circuit 16, is applied to a conventional distance element 20, through a switch 19. The quantity at the output of switch 19 is m'. Distance element 20 could be an electromechanical element or it could be implemented in a microprocessor (digital) relay.

The output of the distance element circuit 20 is used to control the associated circuit breaker (not shown) in the manner described above. In particular, when the m' value is greater than the set reach value, the relay does not produce a trip signal to its associated breaker, while when the m' signal is less than the set reach value, the distance element will produce a trip signal which operates the circuit breaker.

The advantage of the circuit of FIG. 1 over existing circuits is that by smoothing the original m value by the use of a filter, the accuracy of the output is improved, particularly when the m value is very close to the set reach value, i.e. the accuracy of the determination of whether the fault is within zone one is improved.

Filter 18, however, is not always connected in system 10, i.e. sometimes it is bypassed. At select times it is connected in the system, and at other times it is not. This is accomplished by selection logic circuit 21, operating on a switch 19. When the switch is in a position such that the filter 18 is bypassed, the m value from circuit 16 is applied directly to the distance element 20, in conventional fashion.

Logic circuit 21 determines when filter 18 is to be in the circuit, i.e. when $m_s$ values become m' values and are sent to distance element 20. Filter 18 is bypassed when the m value from circuit 16 is so far below the set reach value for the selected zone that it is virtually assured that the fault is in fact within the selected zone of protection. In such a case, filter 18 is not needed for accuracy.

While it is perhaps advantageous from an accuracy standpoint that filter 18 nearly always be in the system 10, it does increase the time required to reach a trip/no trip decision from the distance element 20, i.e. the filter 18 takes some time to produce an $m_s$ signal from an incoming m signal. This results in a longer time before a trip decision is made by the distance element 20; in certain cases, a fault will thus last longer than would otherwise be the case. The threshold value of m for changing switch 19 can be varied significantly. There is value in having the threshold set as low as 50% (0.5) of the setting value. In that case, when the m value is less than 0.5 of the setting value, the m value unfiltered will be applied to the distance element, resulting in a faster fault determination, while when the m value is 0.5 of the setting value or above, the filtered m value will be applied to the distance element, which increases the time for making a determination, due to the action of the filter, but improves accuracy. A typical range of filter delay is approximately 1-2 power system cycles, but would depend on the actual filter implementation.

In a more typical situation, the m threshold for changing switch 19 to pass $m_s$ values is set at the anticipated error of the overall system. For instance, if the error in the system was determined to be 8%, then the threshold value would be selected to be 92% (0.92) of the set reach value. The threshold could also be set slightly lower for security, e.g. the error rate plus 5%, so that the threshold is 87%, producing a safety factor beyond the actual error rate. This could also be varied.

The filter circuit 16 in the embodiment shown is an infinite impulse response filter, although this particular type of filter is not critical. The filter must be able to reject noise and smooth the m calculation because of changes in voltage and current. The $m_s$ value is determined in the filter by the following equation.

$$m_{sk} \text{ is} = 0.6 \cdot m_k + 0.4 \cdot m_{s(k-1)}$$

The above equation is based on successive samples of voltage and currents. The most immediate calculation of $m_s$, referred to in the equation as $m_{sk}$, is based on the value of $m_k$ (the kth unsmoothed input to the filter) and $m_{s(k-1)}$, the last previous smoothed output of the filter. This is one example of a filter calculation. Other calculations can certainly be used.

Figure 2A:
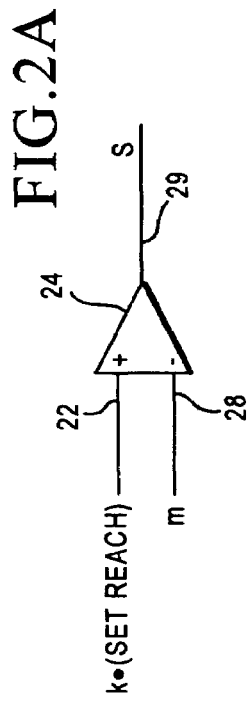
FIG. 2A is a diagram showing a portion of the system of FIG. 1.

One part of the selection logic for switch 19 is shown in FIG. 2A. In this embodiment, the threshold percent value (the variable k) is set at 0.92 of the set reach value. It should be again understood, however, that this threshold (the value of k) can be varied significantly. The threshold value (k·set reach) is applied to one input 22 of a comparator 24. At the other input 28 to comparator 24 is the calculated m value from circuit 16. The output of comparator 24 on line 29 (the "S" output) is applied to switch 19, which controls the input to distance element 20, selecting between the unsmoothed value m and the smoothed value $m_s$ from filter 18. In FIG. 2A, when output S from the comparator is one (high), the m' input to distance element 20 is equal to the m value from circuit 16, while when S is zero (low), m' equals $m_s$ from filter 18.

The arrangement of FIG. 2A, in the selection logic circuit 21 in FIG. 1, makes the smoothed/nonsmoothed decision for the input to the distance element. Using $m_s$ improves the accuracy of the distance relay, while using m preserves the original speed of circuit 10.

It is recognized that improved accuracy results in a decrease in speed. A modification of the system 10 is shown in FIG. 2B, which is also part of the selection logic circuit 21 and which increases the speed of the filter, i.e. decreases the delay caused by the filter.

Figure 3:
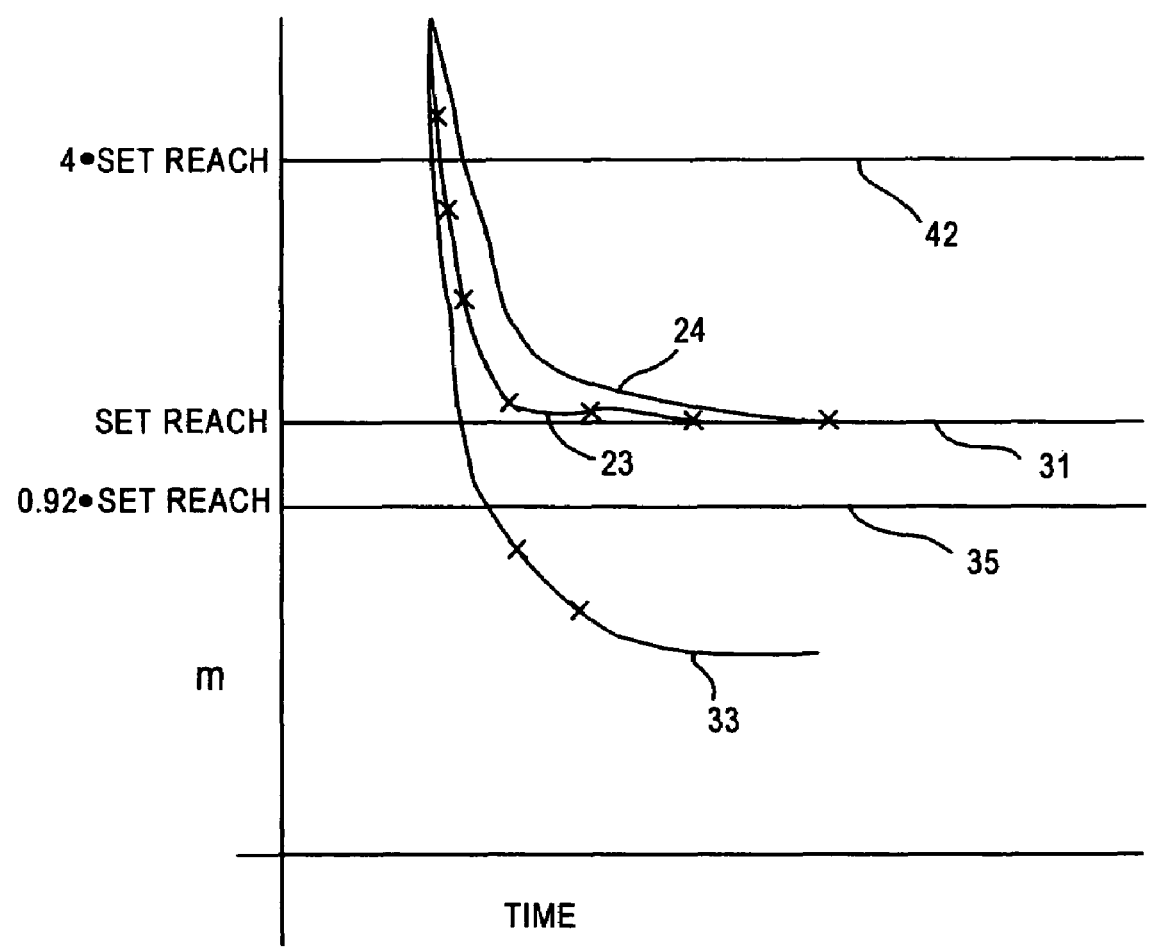
FIG. 3 is a diagram of the trajectory of the m calculation as it approaches the set reach value.

FIG. 3 makes some comparisons between the m value trajectory during a fault for various circuit conditions. Curve 23 (unfiltered) in the center approaches the set reach value (line 31) but varies or perturbates to an extent, due to noise and variations in the voltage and current inputs. The m value "settles" quite quickly, however. The $m_s$ value (filtered) is curve 24, which is smoother than curve 23 but takes quite a bit longer to settle to its final value. Line 35 shows the 0.92 set reach value discussed above. The delay caused by the filter is particularly a concern relative to a fault which produces an m value which is significantly less than the set reach value (line 31), such as illustrated by curve 33. The fault represented by curve 33 can damage the power system (or parts thereof) and should be isolated as quickly as possible (it is a close-in fault). However, the filter delays the trip action.

Figure 2B:
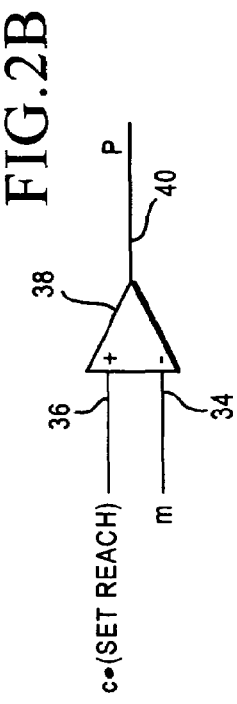
FIG. 2B is a diagram showing another portion of the system of FIG. 1.

FIG. 2B shows a portion of logic section 21 which increases the speed through the filter. When the power system is unfaulted, the calculated m produced by the circuit of FIG. 1 will be substantially larger than the "set reach value" for zone one. In fact, it is typically significantly more than four times (400%) the set reach value. This large m value signal will operate to charge the smoothing filter 18 output to a large number. When a fault does occur, it then takes a long time for the filter ($m_s$), output to decrease to a number close to the threshold value. While the actual m value itself from circuit 16 can decline quickly, filter 18 cannot respond as quickly. This is responsible for the delay in operation introduced by the filter.

In the present invention, when the m value from circuit 16 begins to decrease from its unfaulted high value due to a fault, reaching another (second) selected threshold relative to the zone set reach value (determined by variable c in FIG. 2B), in this case four times the zone one set reach value (line 42 in FIG. 3), filter 18 is immediately charged to just four times (400%) the set reach value. Hence, instead of the output of filter 18 having to decrease over a specific time from a value which is still typically significantly-above four times the set reach value, as it attempts to follow the decrease in the m value at its input, the filter output is immediately changed (decreased) to the selected threshold value (but still significantly above the first threshold value), thus saving some filter response time. The value of c, while shown to be 4 for illustration, can vary, depending on speed and security considerations.

Referring to FIG. 2B, when the m value on line 34, which will typically be significantly higher than four times the set reach value for an unfaulted line, decreases to the threshold value on line 36, because of a fault condition on the power line, the output on line 40 (signal P) of comparator 38 changes from zero to one (low to high). That signal is then applied to filter 18, which in turn preloads or charges the filter to four times the set reach value, in the particular embodiment (example) shown.

This charging of the filter to a lower value than it would otherwise be at that point in time from the start of the fault and the beginning of the decrease of the m value saves time in the overall decrease of the output of filter 18 as it follows the m input. While the embodiment of FIG. 2B precharges the filter, it will not, however, entirely eliminate the delay caused by the filter. It will rather decrease the delay and therefore improve the overall speed performance of the relay. Again, it should be understood that the four times (400%) the set reach threshold value can be varied, depending upon the individual system and the relay. For instance, it could be that the relay calculates an m value which is not much greater than four times the set reach value during a non-faulted condition. Under those circumstances, the threshold value on line 36 to comparator 38 and the precharge value applied to filter 18 could be significantly less than the four times the set reach value. While the circuit of FIG. 2B is advantageous, it does not have to be included with the circuit of FIG. 2A.

Figure 4:
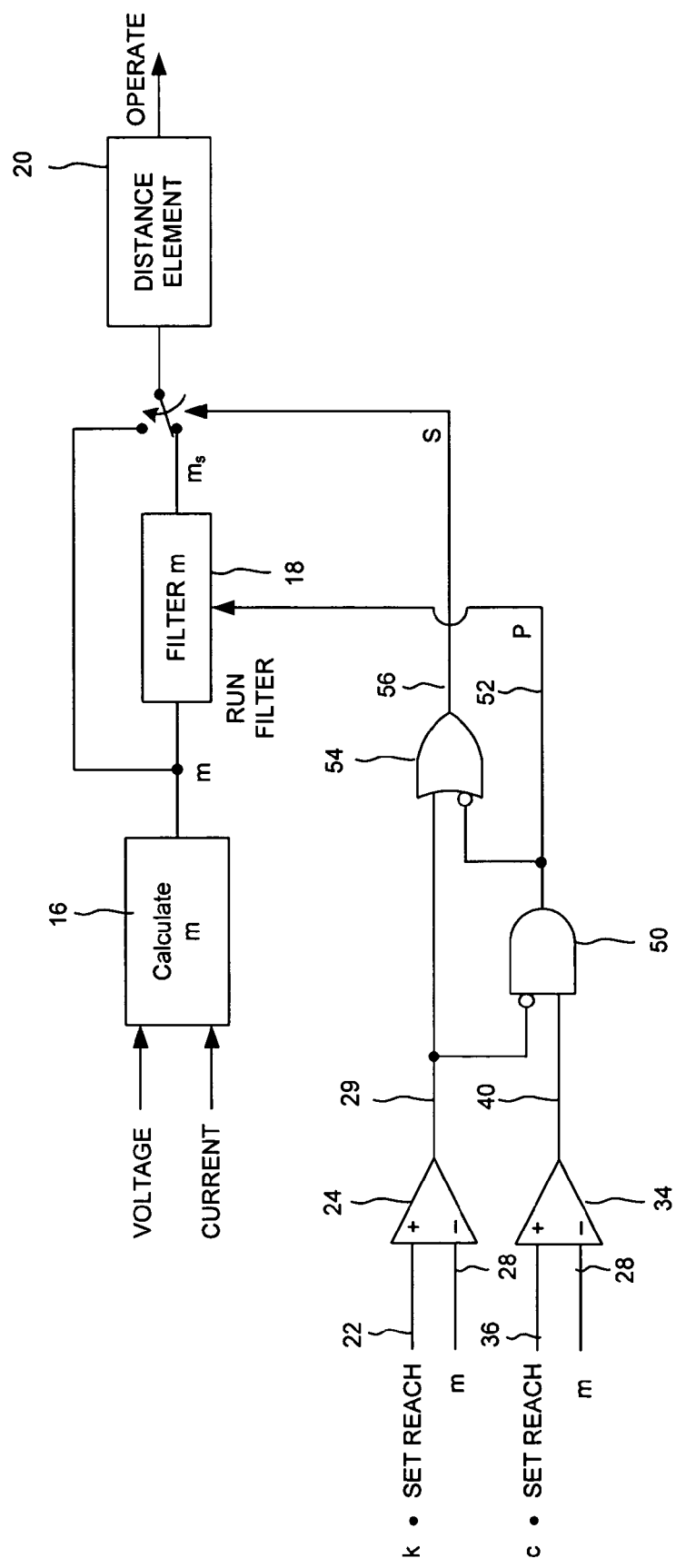
FIG. 4 is a logic diagram illustrating a portion of the system of the present invention.

FIG. 4 is a logic diagram illustrating a portion of the system of the present invention. Referring to FIG. 4, the comparators 24 and 38 of FIGS. 2A and 2B are included. Also included are an AND-gate 50 and OR-gate 54. The AND-gate 50 has a first input coupled to the output 40 of the comparator 38, a second inverting input coupled to the output 29 of the comparator 24 and an output 52. The OR-gate 54 has a first inverting input coupled to the output 52 of the AND-gate, a second input coupled to the output 29 of the second comparator and an output 56. Operating as described in connection with the switch 19, the m value is provided to the distance element 20 upon an occurrence of a binary low value for the output 52 of the AND-gate and a binary high value for the output 56 of the OR-gate (i.e., m value is >c*SET REACH or m value is <k*SET REACH), while the $m_s$ value is provided to the distance element upon an occurrence of a binary high value for the output 52 of the AND-gate and a binary low value for the output 56 of the OR-gate (i.e., k*SET REACH<m value<c*SET REACH).

In operation, the first distance value m is compared to a first percentage of a zone reach value, in the instant example c*SET REACH, to form a first binary output provided to the AND-gate 50. The first distance value m is also compared to a second percentage of the zone reach value, in the instant example k*SET REACH, to form a second binary output provide to the OR-gate 54 and (inverted) to the AND-gate 50. The first percentage of the zone reach value is a value greater than the zone reach value, and the second percentage of the zone reach value less than the zone reach value. When the first binary output comprises a low binary value or when the second binary output comprises a high binary value, the first distance value m is provided to the distance element. When the first binary output comprises a high binary value and the second binary output comprises a low binary value, a second distance value, or the filtered $m_s$ value, is provided to the distance element.

Although a preferred embodiment of the invention has been disclosed here for purposes of illustration, it should be understood that various changes, modifications and substitutions may be incorporated in the invention without departing from the spirit of the invention, which is defined by the claims which follow.

What is claimed is:

1. A system for improving the performance of a distance-type protective relay for power systems, wherein the relay includes a calculation circuit responsive to voltage and current values from the power line to produce a quantity analogous to the distance between the relay and a fault on the power line, wherein the quantity is applied to a distance element for comparison of said quantity with a setting reach value for a selected zone of protection, the system comprising:
    a filter circuit responsive to said quantity for filtering said quantity before the quantity is applied to the distance element, resulting in noise attenuation of the quantity; and
    a control circuit for controlling the application of the filtered quantity to the distance element such that the filtered quantity is applied only when said quantity is above a preselected first threshold value and below a preselected second threshold value.

2. The system of claim 1, wherein the preselected first threshold value is a selected percentage of the setting reach value.

3. The system of claim 2, wherein the selected percentage is 100% minus an error of the system plus 5% for the relay.

4. The system of claim 2, wherein the selected percentage is approximately 92%.

5. The system of claim 1, further comprising a circuit for pre-charging the filter to the preselected second threshold value when said quantity decreases to the preselected second threshold value from said high value, in response to a fault.

6. The system of claim 1, wherein the preselected second threshold value is approximately four times the setting reach value.

7. A method for selecting between one of an unfiltered m value and a filtered m value provided to a distance element of a protective relay providing protection for a transmission line of a power system, the protective relay including a calculation circuit adapted to provide the unfiltered m value indicative of a distance between the protective relay and a fault, and a filter adapted to filter the unfiltered m value to form the filtered m value, the method comprising:
    comparing the unfiltered m value to a first percentage of a zone reach value to form a first binary output, the first percentage of the zone reach value greater than the zone reach value;
    comparing the unfiltered m value to a second percentage of the zone reach value to form a second binary output, the second percentage of the zone reach value less than the zone reach value.
    providing the unfiltered m value to the distance element when the first binary output comprises a low binary value or when the second binary output comprises a high binary value; and
    providing the filtered m value to the distance element when the first binary output comprises a high binary value and the second binary output comprises a low binary value.

8. The method of claim 7, wherein the first binary output has a binary high value when the first percentage of the zone reach value is greater than the unfiltered m value, and has a binary low value when the first percentage of the zone reach value is less than the unfiltered m value, and wherein the second binary output has a binary high value when the second percentage of the zone reach value is greater than the unfiltered m value, and has a binary low value when the second percentage of the zone reach value is less than the unfiltered m value.

9. The method of claim 7, wherein the filter is charged immediately after the unfiltered m value is equal to or less than the first percentage of the zone reach value, the unfiltered m value equaling the first percentage of the preselected setting indicating an occurrence of a fault in the transmission line.

10. The method of claim 7, wherein the filter operation is defined by $ms_{k-1}$.

* * * * *